April 30, 1957     N. ANTON     2,790,947
POWER SUPPLY CIRCUITS FOR RADIATION DETECTORS OR THE LIKE
Filed May 22, 1953
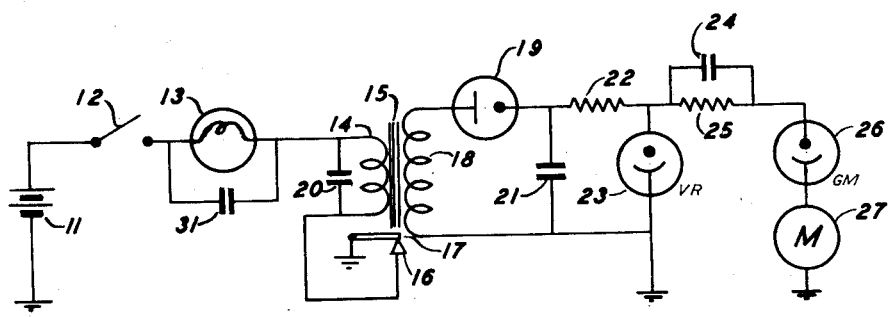
NICHOLAS ANTON
INVENTOR.
BY Morris Relson
ATT Y United States Patent Office 2,790,947
Patented Apr. 30, 1957

2,790,947

POWER SUPPLY CIRCUITS FOR RADIATION DETECTORS OR THE LIKE

Nicholas Anton, Brooklyn, N. Y.

Application May 22, 1953, Serial No. 356,726

9 Claims. (Cl. 321—2)

The present invention relates to the art including power supply circuits for portable instruments, such as radiation detectors or the like, and is more particularly concerned with improving the output voltage stability of battery-operated power supply circuits despite changes in operating voltage of such batteries or other changes in operating conditions.

In many applications it is necessary to provide self-contained electrical or electronic equipment energized from portable batteries such as dry cells. One prominent example of such apparatus is in the field of radiation detectors, where portability, compactness and light weight are important. In many such applications, including the one mentioned, the requirements for operating voltage prohibit the use of batteries alone, and it has become customary to use dry cell batteries as the primary voltage source to drive a suitable converter which will provide the necessary high operating voltages. For example, one or two dry cells operating at 1.5 volts can be made to provide a voltage of the order of 700 volts to a low-drain load by the use of suitable converter apparatus.

Where a large voltage step-up is needed, such as the value in the illustration just given, it will readily be appreciated that even a very small change in voltage of the primary dry cell source can produce considerable variation in output voltage. As is well known, dry cells during their useful life gradually decline in voltage from an initial terminal voltage of about 1.5 volts to as low as 1.0 volts, more than a 30% decline. Any corresponding variation in the magnified output voltage would be completely intolerable. It has accordingly become necessary to assure in some way a fairly constant high operating voltage in accordance with the requirements of the instruments or apparatus in question. One way has been to use only a short portion of the life of the battery during which its voltage declines but slightly. This, of course, is wasteful of the batteries used and requires frequent change of batteries.

Another way of attempting to accomplish this desired result has been to provide voltage regulator tubes and/or circuits in the output of the converter system. Such regulator circuits have proved useful in many situations, but are also uneconomical in general since almost universally they operate by diverting a portion of the converter output in order to maintain constant voltage. Necessarily the diverted portion of the converter output is not usefully employed and constitutes a waste of energy reducing the life of the batteries.

These problems have become particularly important where vibrator type converters are used, such vibrator converters being in widespread use. In such vibrator converters the current from the battery is periodically interrupted in an inductive device. The rapid rate of change of current thus produced creates a high inductive voltage kick which can be further increased by transformer or autotransformer action to produce a high peak value pulsating voltage. Such a voltage can then be rectified to produce a high level direct voltage, such as needed for an operation of radiation detector tubes or other electronic devices.

In such vibrator systems, the output voltage is very sensitive to changes in circuit impedance. Thus, the output derived is determined by the storage of energy in an inductive device, which energy is suddenly released by the vibrator contacts to provide the voltage impulse. To get maximum output, it is important that the greatest amount of energy be stored. This in turn requires the vibrator contacts to have a relatively high "on" time, during which the battery supplies energy to the vibrator. Changes in vibrator "on" time will then cause undesirable fluctuations in output.

In addition, this "on" time is determined by the relationship between the vibrator primary impedance and that of the energy source, namely, the battery. For any desired "on" time, the vibrator primary can be designed to have the proper impedance for efficient operation. However, changes in battery impedance, consequent upon aging or battery drain, will change the circuit impedance relations so that the "on" time is undesirably modified.

According to the present invention, this undesired modification is avoided by providing means for maintaining the battery circuit impedance at a uniform value, by automatically compensating for any changes in battery internal impedance. This is done by the use of a ballast tube or resistor connected in series with the battery source and serving to maintain constant impedance for the battery circuit. By thus controlling the input to the vibrator before voltage step-up occurs, a considerable degree of regulation is obtained. When this regulation is combined with the conventional voltage regulator tube circuit in the output of the converter, a high degree of regulation is attained which may, for example, maintain an output voltage of 700 volts within a few volts when operating from two 1½ volt dry cells in series.

These and other advantages, objects, and characteristics of the present invention will become more fully apparent from consideration of the following description of a preferred embodiment thereof, taken in conjunction with the appended drawing which in its single figure shows a schematic circuit diagram of a vibrator converter system acting as power supply for a radiation detector in accordance with the present invention.

Referring to the drawing, the battery 11 is connected in series with a main switch 12 and a ballast tube 13 to the primary winding 14 of the vibrator-transformer 15 and thence to the fixed contact 16 and armature contact 17 of the vibrator-transformer 15. The primary winding 14 is preferably shunted by a small capacitor 20 of the order of 0.01 microfarad. It will be understood that armature 17 is normally in contact with the fixed contact 16 in the absence of energization of the primary 14, as when switch 12 is open. However, when the switch 12 is closed, current from battery 11 flows through primary winding 14 to attract armature 17 away from fixed contact 16, whereby the circuit is interrupted. The rapid rate of change of current thus produced in the primary 14 induces a high magnitude voltage kick in the secondary winding 18 of the vibrator-transformer 15. The voltage across secondary winding 18 is hence a series of periodic voltage pulses of high magnitude. For example, for a dry cell battery 11 of 3 volts it is possible to attain over 700 volts from secondary winding 18. This secondary voltage is rectified in a cold cathode type half-wave rectifier tube 19, the rectified output being filtered by a shunt filter capacitor 21. The voltage regulator tube 23 and a resistor 22 are connected between the high voltage terminal of capacitor 21 and the grounded terminal of both capacitor 21 and secondary winding 18 to provide a stabilized output voltage. In the illustration here given, the stabilized output is supplied through parallel-connected capacitor 24 and resistor 25 to a radiation detector tube, such as a Geiger tube 26, in series with any suitable type of indicator schematically represented at 27.

In order to avoid a high loss of energy and wasted battery capacity otherwise produced by the voltage regulator tube 23, which in conventional manner operates to drop voltages which are too high by discharging current through the tube 23, recourse is had to the ballast tube 13 in the primary exciting circuit. As is well known, such ballast tubes are nonlinear resistance elements, whose resistance decreases with decrease in current through it, so that with a fixed voltage source it tends to maintain constant current. As the internal resistance of battery 11 increases, due to aging, the consequent reduction in terminal voltage would tend to reduce the current through primary winding 14 and ballast tube 13. The resistance of ballast tube 13 also varies and becomes lower. This compensates for the increase in internal resistance of battery 11 and tends to maintain substantially uniform the total impedance in circuit with primary winding 14. As a result, the current through primary winding 14 is kept more nearly uniform, which in turn maintains the desired "on" time and regulates the vibrator output voltage.

It is preferable that the ballast tube 13 be of small heat capacity so that it may respond quickly to even small changes in current to help compensate for such changes. However, the current flow in the primary winding 14 and hence in the ballast tube 13 is of pulsed wave form having extremely high peaks caused by the back electromotive force generated in primary winding 14 when the contacts 16, 17 open. Such high intensity peaks may create such high temperatures in the low heat capacity ballast tube 13 as to burn out the tube. This is prevented, according to another feature of the present invention, by connecting the capacitor 31 in shunt with the ballast tube 13, thereby causing the peaks of the pulsed primary current to bypass the ballast tube 13 while causing the ballast tube 13 still to respond to the average current in the primary circuit. The bypassing action is preferably made as complete as possible, by use of large capacitors, such as of from 100 to 500 microfarads of capacitance. By such means it is possible to maintain extremely close and accurate regulation of the output voltage. For example it can be regulated to within one or two volts at an output voltage of approximately 700 volts.

In a circuit successfully operated in this manner, representative circuit values were as follows: The ballast tube 13 was an iron wire hydrogen atmosphere tube designed to give about 12 ohms at 1.4 volts and 3 ohms at .3 volts. The iron wire was .005 inch in diameter and approximately 10 mm. long. Bypass capacitor 31 was 100 microfarads. Rectifier tube was a Raytheon type QF778 or CK–1036. Capacitor 21 was .005 microfarad. Resistor 22 was 1.2 megohms. Regulator tube was a type VR404 adjustable voltage tube of approximately 650 volt rating. The output was thus kept within about 2 volts of the normal output voltage of 650 volts.

While the present invention has been described with respect to a power supply for radiation detector instruments, it will readily be understood that it can equally well be utilized for many other widely varying instruments or apparatus wherever close regulation of a high output voltage is required for a circuit powered by a varying voltage source, such as batteries.

Since there are many other modifications which can be readily conceived without departing from the spirit of the present invention, it is to be understood that the above description is intended to be illustrative only, and is not to be considered in a limiting sense, the present invention being defined solely by the appended claims.

What is claimed as the invention is:

1. A regulated voltage converter comprising a vibrator transformer having primary and secondary windings with an interrupter contact in series with said primary winding, a battery connected in series with said primary winding, a rectifier in series with said secondary winding, a voltage regulating tube connected in shunt to said series-connected rectifier and said secondary winding, and means for stabilizing the output of said converter against increase in internal impedance of said battery comprising a ballast tube in series with said primary winding.

2. A regulated voltage converter as in claim 1, further including means for increasing the peak current capacity of said primary winding circuit comprising a condenser shunted across said ballast tube.

3. A regulated voltage converter comprising a vibrator transformer having primary and secondary windings and an interrupter contact and a battery in series with said primary winding, a rectifier connected in series with said secondary winding, and means for regulating the output of said rectifier despite increase in internal impedance of said battery comprising a ballast tube in series with said primary winding.

4. A regulated voltage converter as in claim 3, further including means for increasing the peak current capacity of said exciting circuit comprising a condenser shunted across said ballast tube.

5. A regulated voltage converter comprising a vibrator having an exciter winding and a pair of output terminals, a battery coupled to said exciter winding, means for regulating the output of said vibrator despite aging of said battery comprising a ballast tube in series with said exciter winding, and means for increasing the peak current carrying capacity of said exciter winding circuit comprising a condenser shunted across said ballast tube.

6. A regulated voltage converter comprising a vibrator transformer having an exciter winding and a pair of output terminals, a battery coupled to said exciter winding, and means for regulating the output of said vibrator despite aging of said battery comprising a ballast tube in series with said exciter winding.

7. A regulated voltage converter comprising a vibrator transformer having primary and secondary windings, an interrupter contact in series with said primary winding and an exciting circuit for said primary winding including a ballast tube and a battery connected in series with said primary winding.

8. A regulated voltage converter comprising a vibrator transformer having primary and secondary windings, an interrupter contact in series with said primary winding and an exciting circuit for said primary winding including a battery in series therewith and a non-linear resistor.

9. A converter as in claim 8, wherein said exciter circuit includes a capacitor in parallel with said resistor.

References Cited in the file of this patent

UNITED STATES PATENTS

| | | |
|---|---|---|
| 1,543,671 | Hinricksen | June 30, 1925 |
| 1,690,566 | Ziegler | Nov. 6, 1928 |
| 2,061,227 | Edwards | Nov. 17, 1936 |
| 2,225,687 | Cox | Dec. 24, 1940 |
| 2,237,448 | Reinhard | Apr. 8, 1941 |
| 2,390,946 | Kneisley et al. | Dec. 11, 1945 |
| 2,584,844 | Constable | Feb. 5, 1952 |